INVENTOR
Arthur Ford

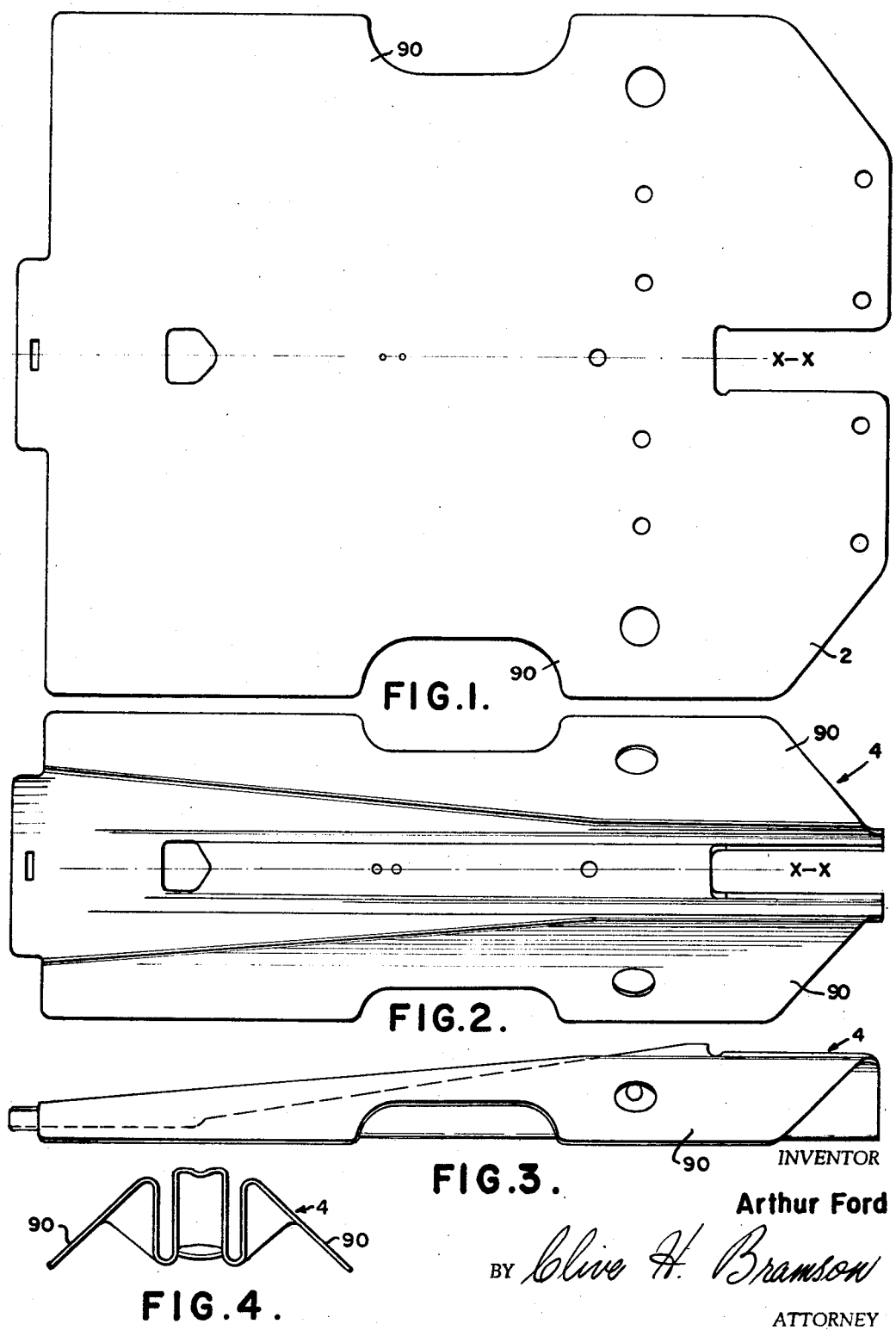

BY Olive H. Bramson

ATTORNEY

March 10, 1970  A. FORD  3,499,308
MOLDING METAL

Filed March 22, 1967  11 Sheets-Sheet 3

INVENTOR
Arthur Ford

BY Clive H. Bramson
ATTORNEY

March 10, 1970  A. FORD  3,499,308
MOLDING METAL

Filed March 22, 1967  11 Sheets-Sheet 4

INVENTOR
Arthur Ford
BY *Clive H. Bramson*
ATTORNEY

INVENTOR
Arthur Ford

March 10, 1970  A. FORD  3,499,308
MOLDING METAL

Filed March 22, 1967  11 Sheets-Sheet 7

INVENTOR
Arthur Ford

BY *Clive H. Bramson*

ATTORNEY

March 10, 1970  A. FORD  3,499,308
MOLDING METAL
Filed March 22, 1967  11 Sheets-Sheet 8

INVENTOR
Arthur Ford

BY *Clive H. Bramson*

ATTORNEY

United States Patent Office 3,499,308
Patented Mar. 10, 1970

3,499,308
MOLDING METAL
Arthur Ford, Smithtown, N.Y., assignor to S. Tepfer &
Sons, Inc., Deer Park, N.Y., a corporation of New York
Filed Mar. 22, 1967, Ser. No. 625,195
Int. Cl. B21d 11/20
U.S. Cl. 72—380                                    7 Claims

ABSTRACT OF THE DISCLOSURE

Forming die apparatus having top and bottom die sections, each die section being vertically movable with respect to the stationary horizontal bed of a power press, and each die section including a pair of horizontally and relatively movable die members, each pair of die members being movable between open and closed positions, said pairs of die members assuming the closed position when said die sections are fully mated and in the open position when said die sections assume the open position. A method of die forming a developed work-blank into a finished article by first shaping the edge extremities of the work-blank and subsequently moving the shaped extremities toward the longitudinal axis of the work-blank while concurrently shaping the central portions thereof.

---

This invention relates generally to methods and means for fabricating sheet metal articles and more particularly to forming die sections adapted to consistently form developed work-blank into articles each having identical predetermined configurations.

Whereas, the formation of sheet metal articles using stamping or pressing procedures is well known, conventional methods and apparatus for accomplishing such operations have, in particular instances, proved inadequate. Where, e.g., the configuration of the finished article includes abrupt longitudinal crests and troughs of substantial amplitude or a number of well defined wave-like corrugations, the use of such conventional forming dies has manifested certain inherent disadvantages, particularly with respect to their inability of yielding consistently dimensional parts. That is, although a minimum of stretching or metal-flow is unavoidable in the die-forming of sheet metal materials, a substantial degree of stretching is commonly experienced in the press-formation of deeply and irregularly surfaced articles such as the bomb-fin articles contemplated and described herein. Accordingly, considerable edge trimming of the article subsequent to the die-forming operation, has heretofore been required, with the attedant additional expenditure of labor and time prior to the obtentions of the finished article.

Briefly stated, prior art die-forming methods and means utilized in forming a metallic article having W-shaped cross-sectional configuration, e.g., progressed from the longitudinal center of the work-blank to the longitudinal extremities thereof; i.e., from the formation of the inverted V-shaped portion and then outwardly to completion by forming the remaining extremities thereof. Substantial stretching of the metal from the central portions to the outer edges unavoidably yielded products of various sizes lacking in uniformity, especially along the edges.

To the end of obviating the foregoing condition, the present invention, through procedures generally converse to well known die forming methods, commences the formation of the article at the outer regions thereof, and then continues the formation by the continued application of pressures toward and at the central regions thereof. The operability of such procedures is favorably and unobviously accomplished by dint of the novel forming dies disclosed hereinbelow, said dies being particularly adapted to the formation of the above-mentioned fin configuration, four such fins being utilized with one aerial bomb.

Accordingly, and consonant with the foregoing, the instant invention has for an object the provision of a novel set of forming dies, the latter being especially suited to forming metallic articles characterized by abrupt, relatively deep longitudinal corrugations.

Another object of the present invention resides in the provision of a pair of forming die sets which coact normally and pivotally, said die sets being further adapted for united vertical movement with respect to a vertically disposed stationary die member.

A further object of this invention resides in the provision of a method of forming shaped articles from uniformly developed blanks to consistently and repeatedly yield identically formed parts requiring no edge trim.

Another object of the present invention is to provide a method in accordance with the foregoing wherein stretch or flow of metal during the pressing operation is greatly minimized and further whereby any otherwise attendant flow is directed from the edge extremities toward the central region of the article.

Other objects and advantages of the instant forming dies and article forming method will be set forth in part hereinafter and in part will be obvious herefrom, or may be learned by practice of the invention, the same being realized and attained by means of the structure defined and pointed out in the appended claims.

The accompanying drawings referred to herein and constituting a part hereof, illustrate one embodiment of the invention, and together with the description which further describes the novel forming procedure, serve to explain the principles of the invention.

FIGURE 1 is a top plan view of the developed blank of sheet metal prior to being formed into the bomb-fin article;

FIGURE 2 is a top plan view of the formed and finished bomb-fin, no further edge trim being required;

FIGURE 3 is a side elevational view of the bomb-fin;

FIGURE 4 is a front end elevation of the bomb-fin;

Figure 5:
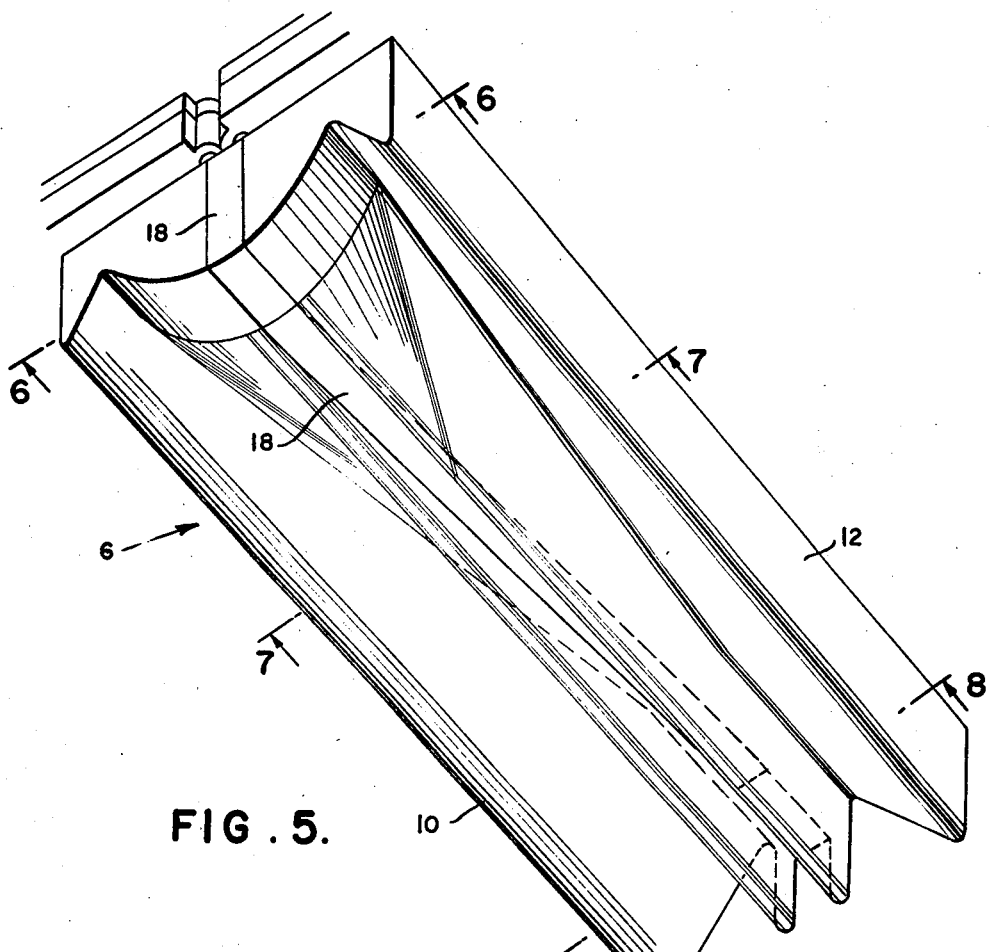
FIGURE 5 is a perspective view of the upper sections of the forming die set, said sections being relatively pivotal and shown in closed position.
Figures 6, 7:
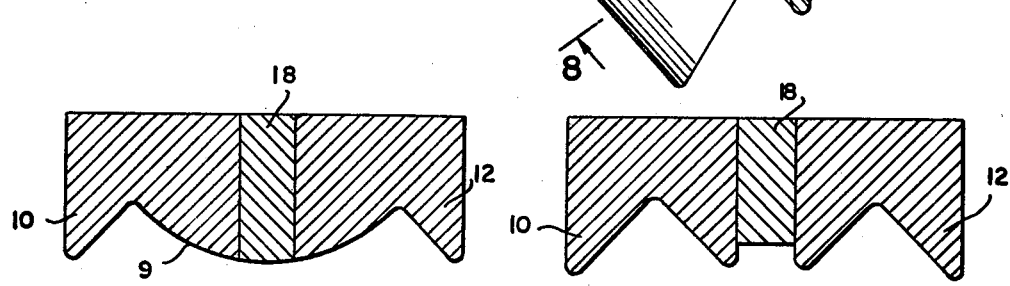
FIGURE 6 is a cross-sectional view taken along line 6—6 of FIGURE 5.
FIGURE 7 is a cross-sectional view taken along line 7—7 of FIGURE 5.
Figure 8:
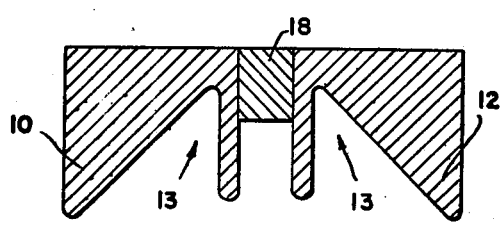
FIGURE 8 is a cross-sectional view taken along line 8—8 of FIGURE 5.

Referring now in detail to the present preferred embodiment of the invention illustrated in the accompanying drawings, FIGURE 1 and FIGURES 2–4, respectively, show the developed work-blanks and shaped article 4 processed and formed by the method and apparatus disclosed herein. It will be appreciated that the said article is one among the many that the present invention is capable of producing and is therefore referred to herein in an explanatory rather than a restrictive sense.

Thus, it will be seen that the work-blank is a substantially flat developed shape and the finished article is a bomb-fin which is considerably narrower than the work-blank and is generally W-shaped with pronounced crests and troughs as heretofore described.

The forming die utilized to the end of shaping the work-blank 2 into the finished article 4 with the obviation of aforementioned edge trimming requirements, is comprised of a top die section 6 and a mating bottom die section 8, the particular contours of said die sections being congruous with one another in a complementing mating manner. Accordingly, reference will be made to FIGURES 5–8 of the drawings for a detailed view of the upper die section 6, the surface topography of said lower die section 8 being of opposing but complementing configuration. Thus, where die section 6 is convex-arcuate of cross-section at 9, die section 8 is concave-arcuate at 11 and e.g., where die section 6 includes a pair of recessed V-shaped regions 13, die section 8 includes a complementing pair of raised V-shaped regions 15.

It will be further observed that each of said die sections 6 and 8, include relatively movable die members 10, 12 and 14, 16, respectively. Die element 18 is, as shown, disposed intermediately of die members 10 and 12 whereby when said die members assume the closed position shown in FIGURE 5, said die element 18 lies along the longitudinal axis of said die section 6; said die element being stationary with respect to said die members to thereby retain the said relatively central position when said die members assume the open position shown in FIGURE 9 of the drawings. Similarly, as will be seen by referring to FIGURE 10, die members 14 and 16 which comprise the lower die section 8, are movable from the open position shown, to a closed position of parallelism with respect to stationary die element 20, arrows 22 being designative of the pivoted movement of which die members 10, 12, 14 and 16 are capable.

More specifically, and for a detailed understanding of the manner of operation of said forming die sections within a power press, reference will now be made to FIGURES 11–17 of the drawings, wherein the entire forming apparatus is generally designated by numeral 24. FIGURES 11–14, present a forward view of the power press, FIGURES 15 and 16 a rearward view thereof, and FIGURE 17 a side elevational view thereof, die sections 6 and 8 and the die elements 18 and 20 being shown mounted thereon, the latter die element being secured by bolt 25 to the press-bed of the forming apparatus.

Die members 10 and 12, as shown, are secured to individual base plates 26 and 28, bolts 30 extending through said base plates and into said die members being utilized for such securement purpose. Wear plates 32 and 34 are secured to said respective base plates, bolts 36 being employed therefor.

Figure 15:
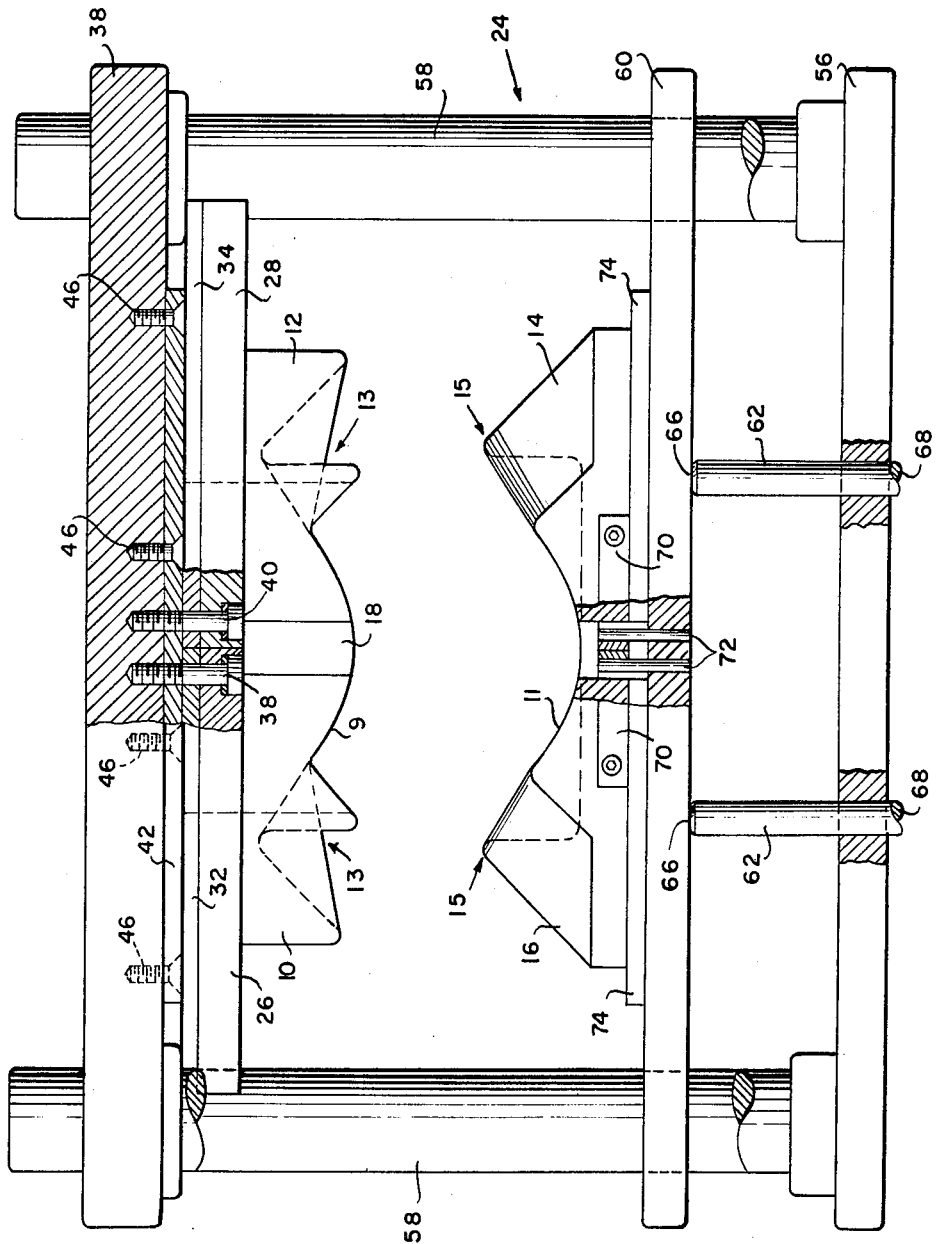
FIGURE 15 is a rear elevational view of the upper and lower die sections shown in the position illustrated in FIGURE 11.
Figure 16:
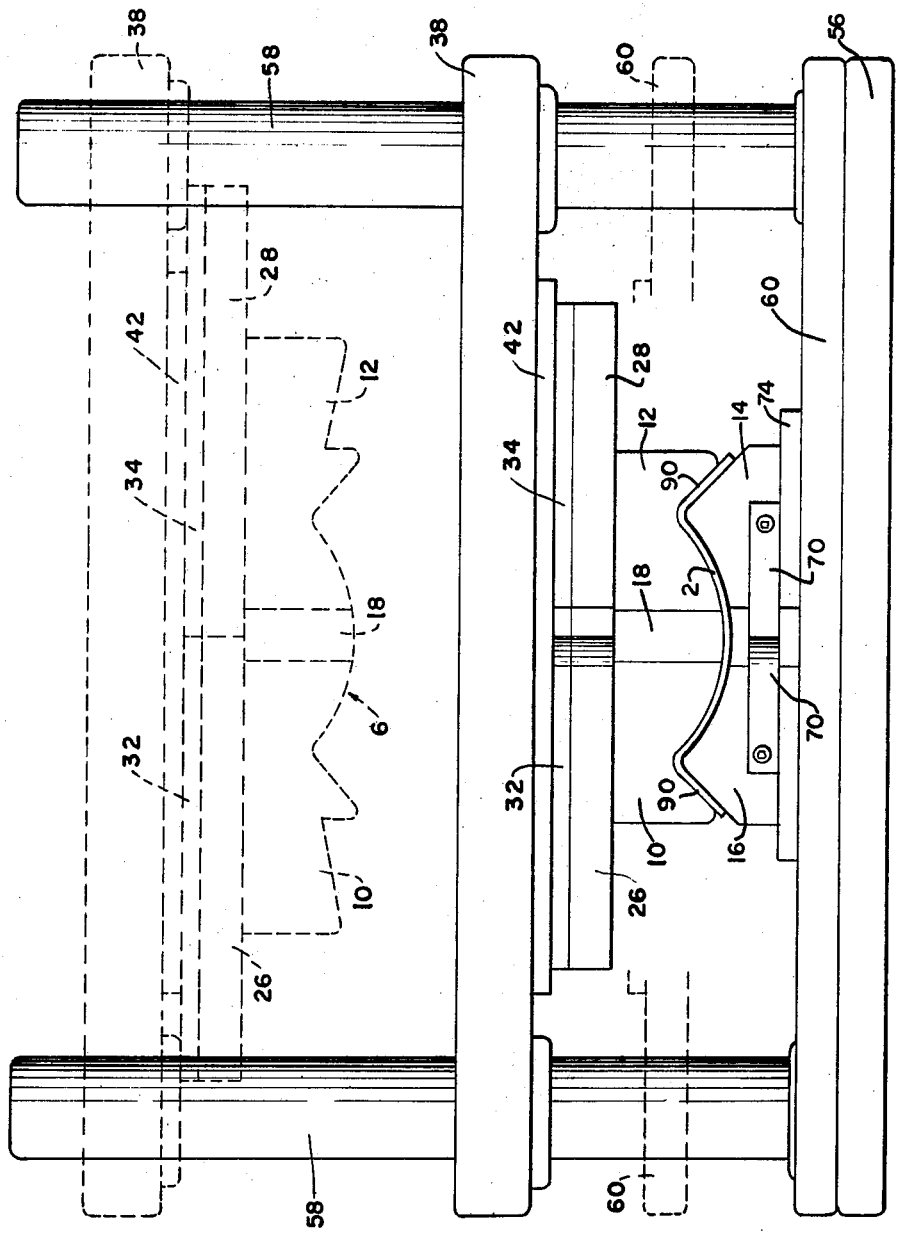
FIGURE 16 is a rear view of the FIGURE 14 illustration also showing, in broken line, the upper die section preparatory to the commencement of the pressing operation.
Figure 17:
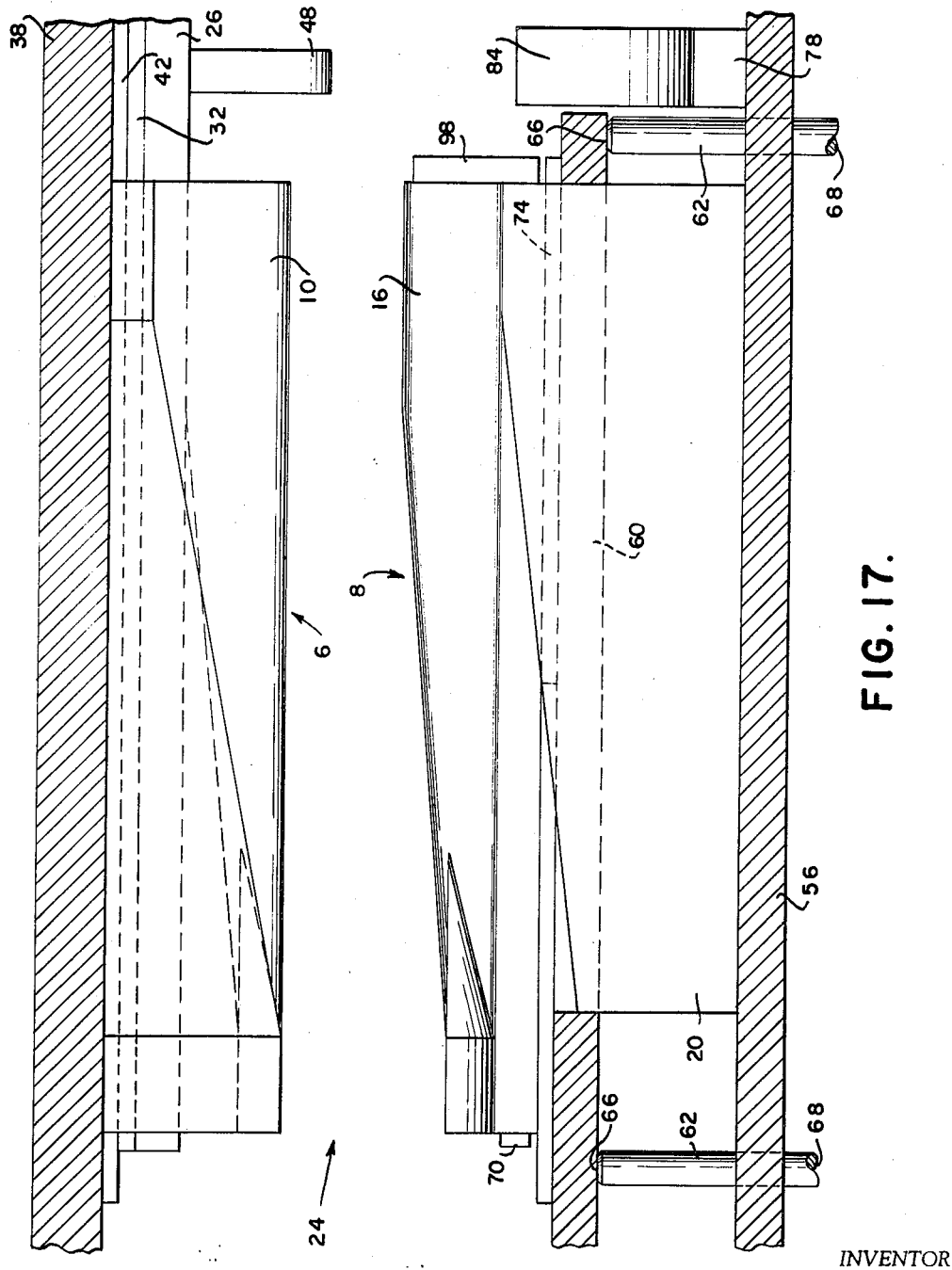
FIGURE 17 is a side elevational partial cross-sectional view of the upper and lower die sections in pre-operative position.

Upper support plate 38 carries base plates 26 and 28, the latter being pivotally connected thereto by bolts 38 and 40, as illustrated in FIGURE 15 of the drawings. Wear plate 42 which is fastened to said upper support plate by bolts 46, coacts with aforesaid respective wear plates 32 and 34 to provide a durable bearing surface for said die members 10 and 12 as the latter move between the open and closed positions to be further described hereinbelow following.

Figure 9:
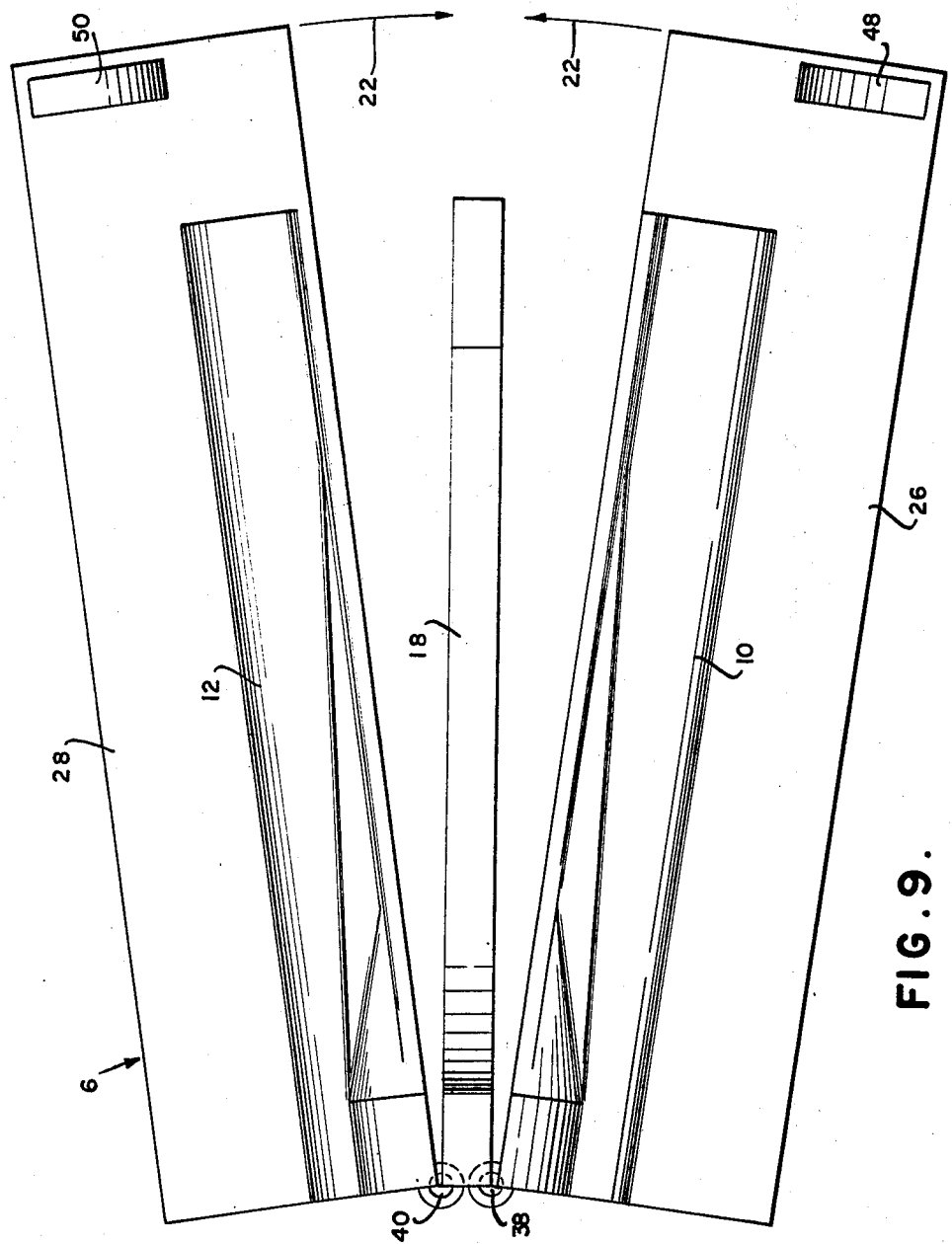
FIGURE 9 is a plan view of the upper sections of the forming die set shown in open position.

Upper cam members 48 and 50 are secured to and depend from base plates 26 and 28 and are located at the forward end of said base plates as shown in FIGURE 9, bolts 52 being provided to accomplish such securement.

Aforedescribed centrally disposed die element 18 is, as shown, secured by bolt 54 to said upper support plate 38, said die element being, therefore, stationary with respect to die members 10 and 12, the latter being pivotal with respect to said die element and swingable from the open position shown in FIGURE 9 to the closed position shown in FIGURE 5.

Figure 11:
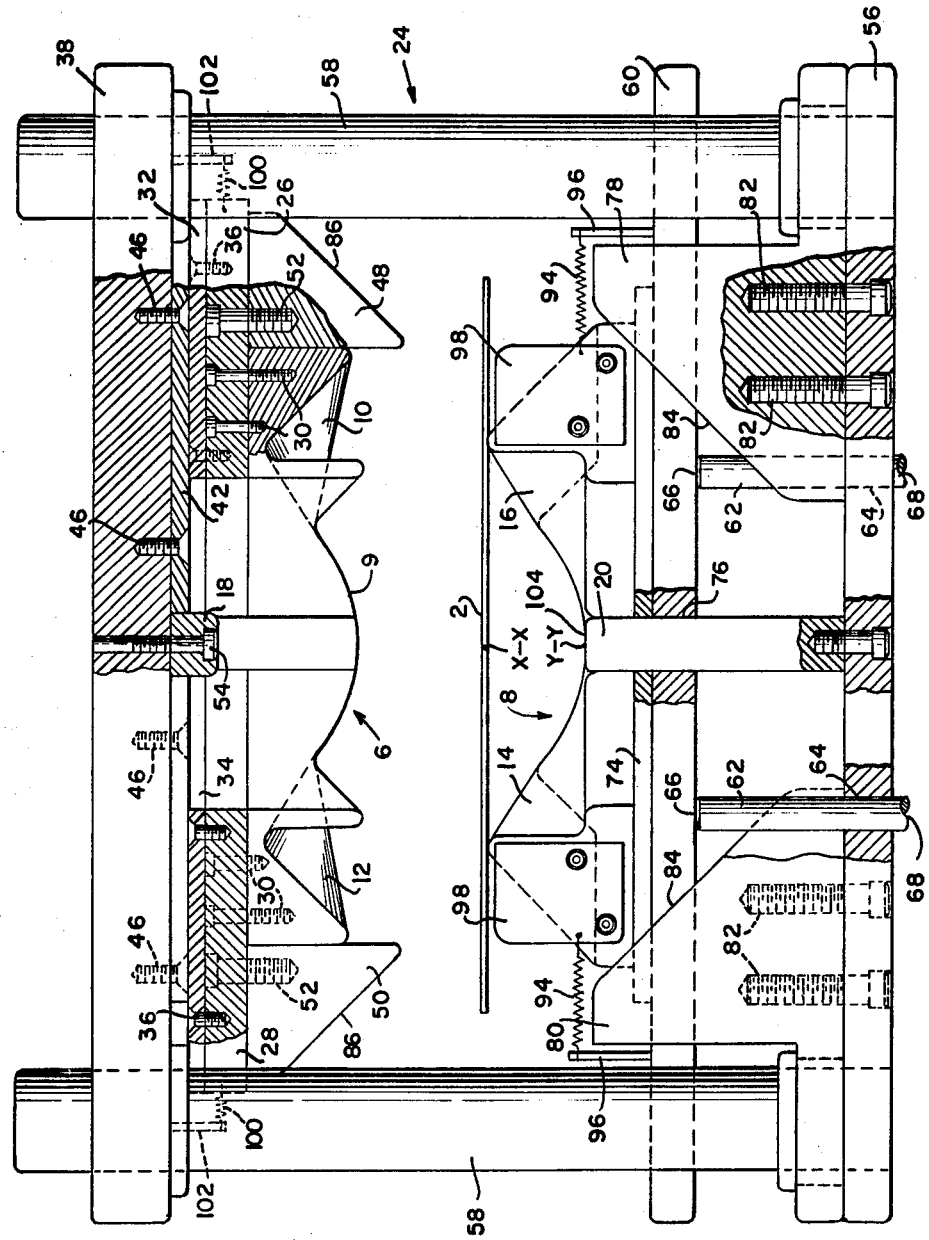
FIGURE 11 is a front elevational view of the upper and lower die sections mounted within a power press, said sections being respectively open in their pre-operative positions.
Figure 12:
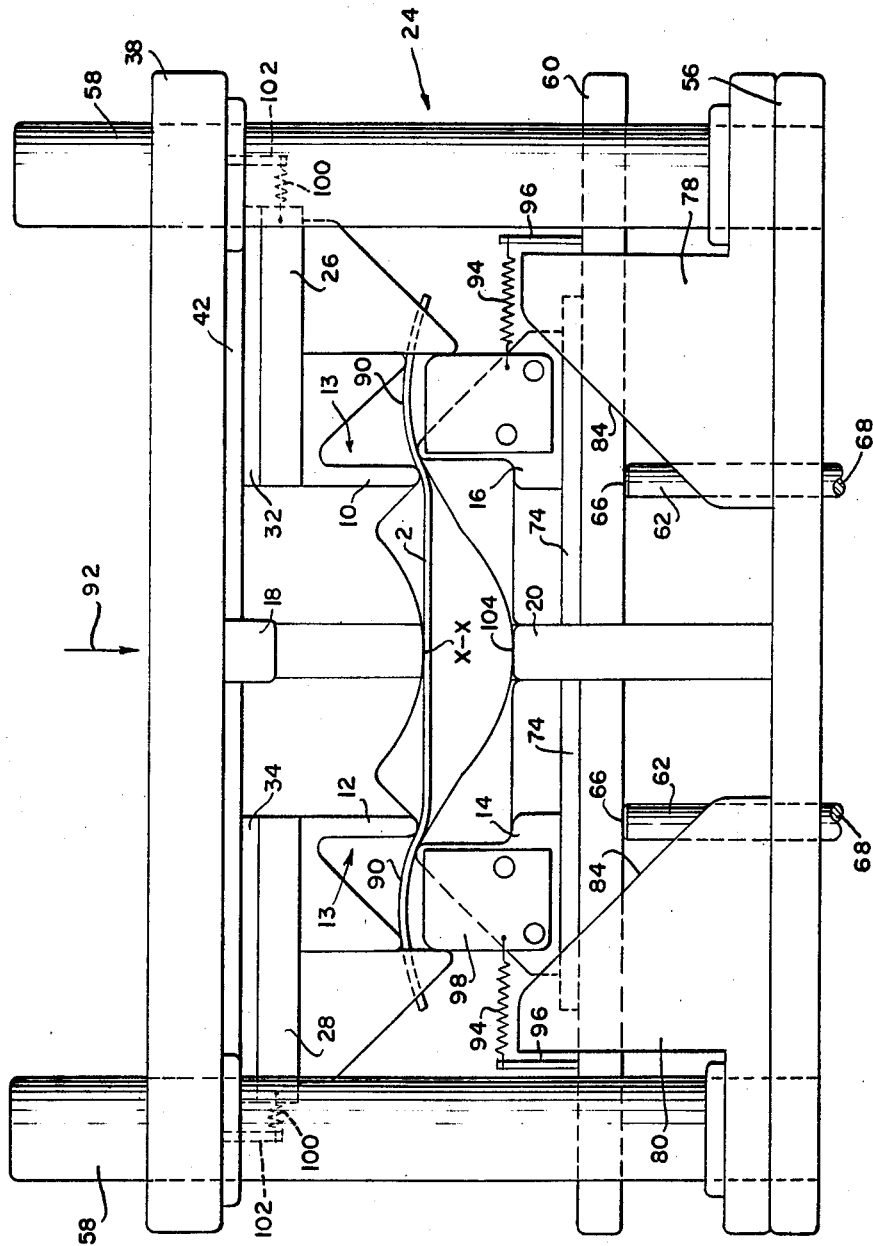
FIGURE 12 is a front elevational view illustrating the beginning of the power stroke and the initial cooperative action of the upper and lower die sections upon the developed work-blank.
Figure 13:
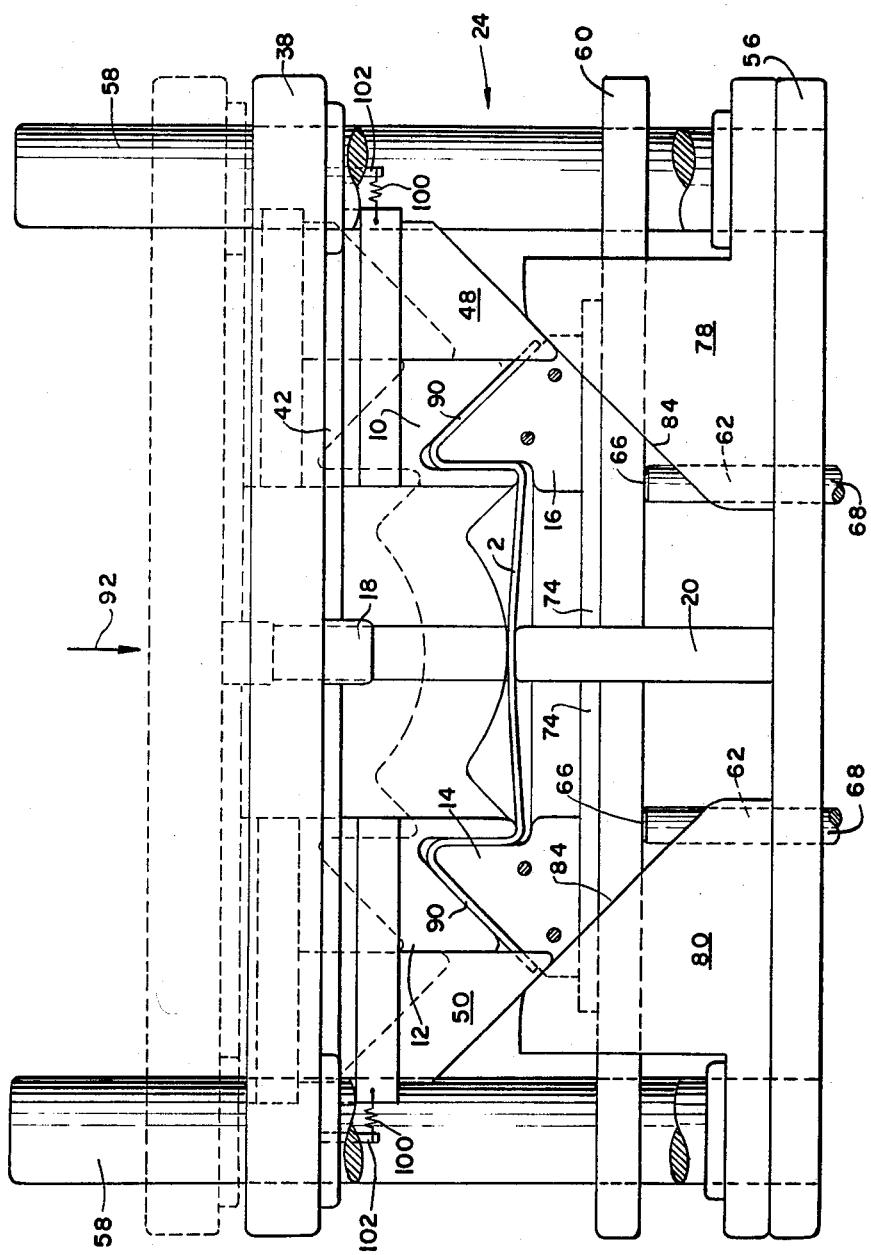
FIGURE 13 is an illustration of an intermediate position of said die set at such time as the formation of the outer extremities of the work-blank is substantially accomplished.
Figure 14:
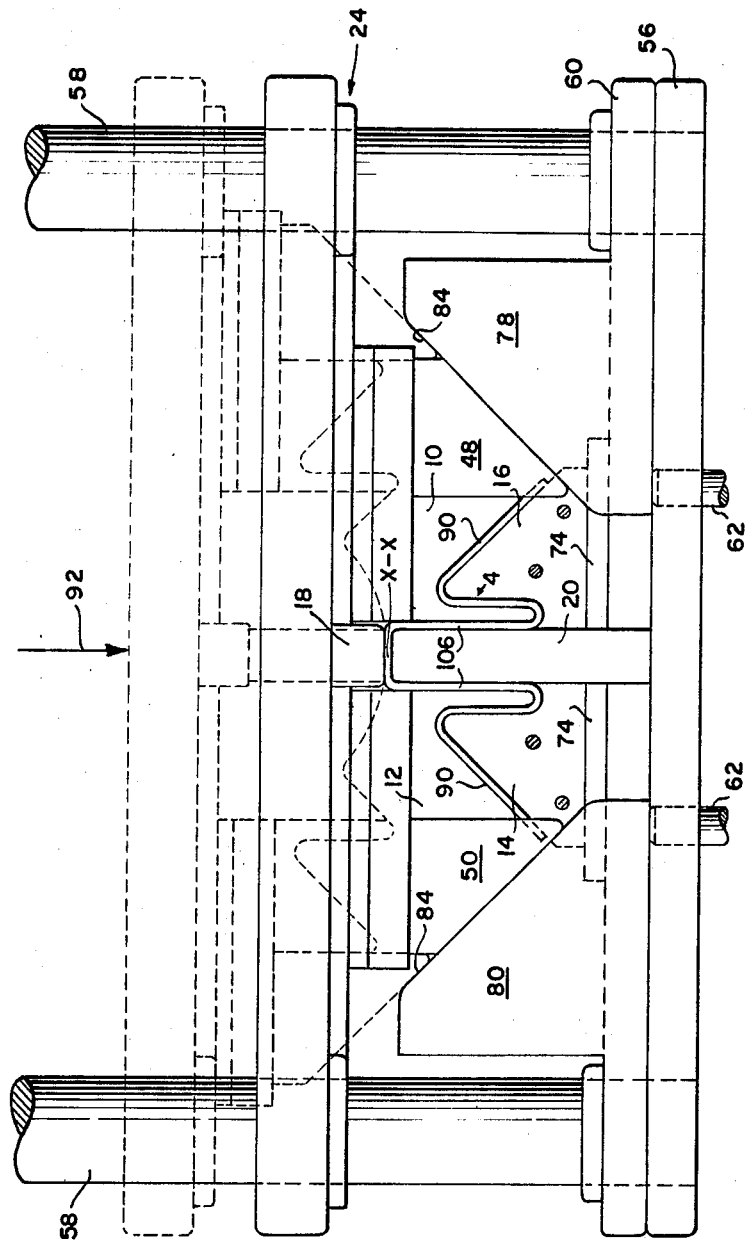
FIGURE 14 is an illustration of the final position of said die set, the latter being in closed position and the bomb-fin being fully formed.

With reference now to the sequence of operative forming steps illustrated in FIGURES 11–14, it will be observed that said die sections 6 and 8 are relatively movable from the separated unmated FIGURE 11 position, to the partially mated FIGURE 13 position and thence to the fully mated position shown in FIGURE 14. It will be further observed that said die sections are movable with respect to stationary press-bed 56 in addition to being movable with respect to one another. That is, upper support plate 38 which carries top die section 6, is vertically movable on guide posts 58, lower support plate 60 being similarly movable toward and away from said press-bed 56 and yieldably supported by pistons 62, the latter being depressable, as shown, under the force of the upper die section acting against the lower die section. Said pistons ride within openings 64 provided through said press-bed, removably contact said lower support plate 60 at ends 66 thereof, and act, at ends 68 thereof, against air cylinders (not shown) which provide cushions of compressed air to control of support plate 60 toward said press-bed during the forming operation and to effectuate return of said support plate to the normally raised position shown in FIGURE 11 at the conclusion of the forming operation.

Figure 10:
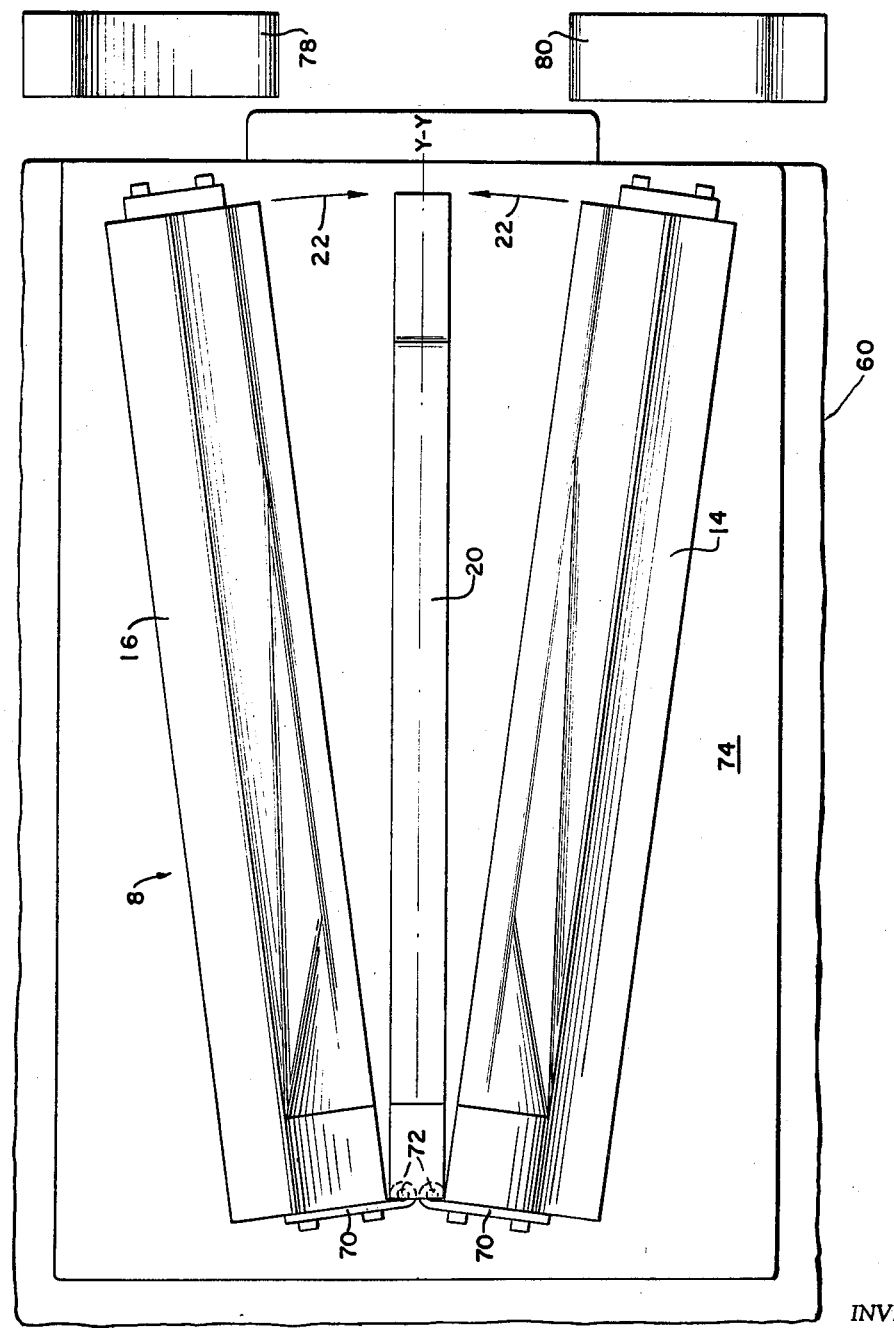
FIGURE 10 is a plan view of the lower sections of the forming die set shown in open position.

As aforementioned, die members 14 and 16 are swingable from the open position shown in FIGURE 10 to the fully closed position seen in FIGURE 14, hinges 70, secured at the rearward end of said die members, establishing the pivotal relation between said die members and said lower support plate 60 at pins 72. Wear plate 74 is secured to said lower support plate to provide a durable bearing surface upon which said die members ride between the aforesaid open and closed positions. Said lower support plate 60 is further provided with an elongate central opening 76 through which die element 20 is received, said support plate being thus capable of vertical movement with respect to said stationary die element.

Lower cam members 78 and 80, as shown in FIGURE 11, are fixedly secured to the forward end of press-bed 56 by bolts 82, sloping edges 84 thereof being vertically aligned with similarly sloping edges 86 of upper support plate 38 is moved from the initial upper and lower cam member coacting position observed in FIGURE 13 to the lowermost position seen in FIGURE 14, the die members of said top and bottom die sections have been moved from the aforedescribed open to the aforedescribed closed position. Of further moment is the concurrent downward or vertical movement of die sections 6 and 8 which commences with the formation or shaping of the outer extremities 90 of said work-blank 2 as illustrated in FIGURE 13 and which continues until said die sections are fully mated and where the die members thereof assume the fully closed position as observed in FIGURE 14 of the drawings. With reference still to FIGURE 14, it will be seen that lower support plate 60 is essentially contiguous with press-bed 56, pistons 62 being depressed whereby the ends 66 thereof are flush with the surface of said press-bed, die elements 18 and 20 being arranged in abutting relation, and said die members being in mutual parallelism and parallel with respect to said die elements.

Ram means for moving the upper support plate and die section 6 carried thereby downwardly in the direction of arrow 92, although not shown, may be of hydraulic, pneumatic, or mechanical means or of any other suitable type. Return means for restoring said upper support plate to the pre-operative position shown in FIGURE 11 may be incorporated with the ram means utilized or may be independent thereof as, e.g., compression springs, hydraulic cylinders or the like. Return springs 94 secured between retainers 96 and rack members 98 functioning to bias die members 10 and 12 to the open position.

The functions of the respective parts of the present apparatus will be understandable from the description already given. However, the operation of the apparatus in its entirety will now be described.

A developed work-blank 2 as shown in FIGURE 1 is positioned upon bottom die section 8 whereby the longitudinal axis X—X of said work-blank is aligned and parallel with the longitudinal axis Y—Y of die element 20. At this stage of the operation the top and bottom die sections are disposed in the open position. Upon movement of the top die section downwardly the work-blank is initially gripped between said die sections as shown in FIGURE 12 and as the forming continues to the degree seen in FIGURE 13, the edge portions or extremities 90 of the work-blank are substantially shaped and totally gripped between the complementary surface contours of the respective sets 10, 16 and 12, 14 of top and bottom die members. As the ram means (not shown) continues to move said top die section toward press-bed 56, bottom die section 8 together with said top die section also moves toward said press-bed and in so doing depresses pistons 62 as shown as lower support plate 60 moves beneath the top surface 104 of die element 20. By reason of the cooperative action of cam members 48, 78 and 50, 80, die sections 6 and 8 are caused to move to the closed position as both said die sections move downwardly and through the partially mated to the fully mated position shown in FIGURE 14. Through these final stages of the forming operation, the edge portions 90 of the work-blank are firmly secured between the die sections, whereby all further shaping proceeds inwardly and centrally of the work-blank, the central region 106 thereof being formed in said final stages by movement of said die members inwardly to the closed position and by the simultaneous drawing of said work-blank over central die element 20, die element 18 as shown, being coacting with the latter.

The novel forming procedure disclosed herein thereby comprises the steps of first shaping the edge extremities 90 of the work-blank 2 and of subsequently moving said shaped edge extremities toward the longitudinal axis X—X of the work-blank while simultaneously shaping the central portions thereof. Further, said shaped edge extremities are gripped to preclude stretching thereof during the shaping of the central portions of the work-blank. The finished article produced thereby, accordingly requires no edge trim, each article so produced being identical. It will be appreciated that although apparatus other than the novel forming dies and arrangement disclosed herein may be utilized to practice the instant shaping method, the instant apparatus is believed preferable and capable of yielding the most advantageous result.

Thus, a method of shaping articles and an apparatus for effectuating said method has been disclosed. Inasmuch as changes may be made in carrying out the above method and apparatus without departing from the scope of the invention, it is intended that all matter contained in the above description shall be interpreted as illustrative and exemplary and not in a limiting sense. Accordingly, such variations falling within the purview of this invention may be made while within the spirit of the invention and without sacrificing any of the attendant advantages thereof, provided, however, that such changes fall within the scope of the claims appended hereto.

What is claimed is:

1. Forming apparatus comprising a press, a top die section and mating bottom die section, each of said die sections including a pair of die members, said die sections being mounted within the press whereby said sections are relatively movable between unmated, partially mated, and fully mated positions, the die members of each respective die section being pivotally mounted within the press for relative swinging movement between a relatively angular open position and a relatively parallel substantially closed position whereby the die members of each respective die section are movable toward and away from each other to enable assumption of said relatively open position when said die sections are unmated and said relatively closed position when said die sections are fully mated.

2. Forming apparatus as defined in claim 1 including cam means operable to move the die members comprising said die sections to said relatively closed position as said die sections move between said partially mated and fully mated positions, said cam means being comprised of first and second coacting elements, said first elements being mounted for united movement with the die members of one die section, said second elements being stationary.

3. Forming apparatus comprising a press, a top die section and a mating bottom die section, each of said die sections including a pair of die members, said die sections being mounted within the press whereby said sections are relatively movable between unmated, partially mated and fully mated positions, the die members of each respective die section being movable toward and away from each other to enable assumption of a relatively open position when said die sections are unmated and a relatively closed position when said die sections are fully mated, a stationary press-bed and movable upper and lower support plates, said top die section being movably secured to and depending from said upper support plate, the die members comprising said top die section being adapted for pivotal movement and parallelism with respect to said upper support plate, said bottom die section being movably secured to said lower support plate, the die members comprising said bottom die section adapted for pivotal movement in parallelism with respect to said lower support plate, said upper and lower support plates being arranged for movement toward said press bed as said die sections move from the partially mated to the fully mated positions.

4. Forming apparatus as defined in claim 3 including a stationary die element secured to said press-bed and disposed normally with respect thereto, said die element being receivable between said die members of said bottom die section and within opening means provided therefor, through said lower support plate.

5. Forming apparatus as defined in claim 4 including cam means operable to move said die members comprising said die sections to the relatively closed position as said die sections move between said partially mated and fully mated positions, said cam means being comprised of first and second coacting elements, said first elements being secured to the die members of one die section for movement therewith, said second elements being secured to said stationary press-bed.

6. A forming die comprising a top die section and a mating bottom die section, each of said die sections including relatively movable die members, said die sections being mountable within a press for relative movement between unmated, partially mated and fully mated positions, cam means secured to the die members of a die section, said cam means being adapted to coact with cam means secured to the press to move said die members of each respective die section from a normally separated open position to a substantially closed parallel position upon movement of said die sections from the partially mated to the fully mated position, said top die section including a convex-arcuate cross-section at one end and a double-V cross-section at the other end.

7. A method of forming a work-blank into a shaped article comprising the steps of placing said work-blank between movable and separable top and bottom mating die sections, each of the latter including a pair of die members which are laterally movable between open and closed positions, moving said die sections to a partially mated position whereby the longitudinal extremities of said work-blank are gripped by said die sections while said pairs of die members are in the open position, simultaneously moving said gripped extremities of said work-blank downwardly and inwardly with respect to a stationary die element disposed in a plane vertical and central of said die sections, and causing said respective pairs of die members to move to the closed position when said die sections are fully mated to thereby complete the formation of the shaped article.

References Cited
UNITED STATES PATENTS

| | | | |
|---|---|---|---|
| 1,970,347 | 8/1934 | Whitesell | 72—181 |
| 1,994,428 | 3/1935 | Keil | 72—379 |
| 2,002,097 | 5/1935 | Peterson | 72—379 |
| 2,251,901 | 8/1941 | Cairns | 72—181 |
| 2,357,204 | 8/1944 | Joyner | 72—395 |
| 2,863,344 | 12/1958 | Barnes | 228—3 |

CHARLES W. LANHAM, Primary Examiner

G. P. CROSBY, Assistant Examiner

U.S. Cl. X.R.

72—379, 452